Sept. 25, 1951         A. LAPRISE         2,569,011
APPARATUS FOR UNLOADING CONVEYER BELTS
Filed Dec. 7, 1949                         2 Sheets-Sheet 2
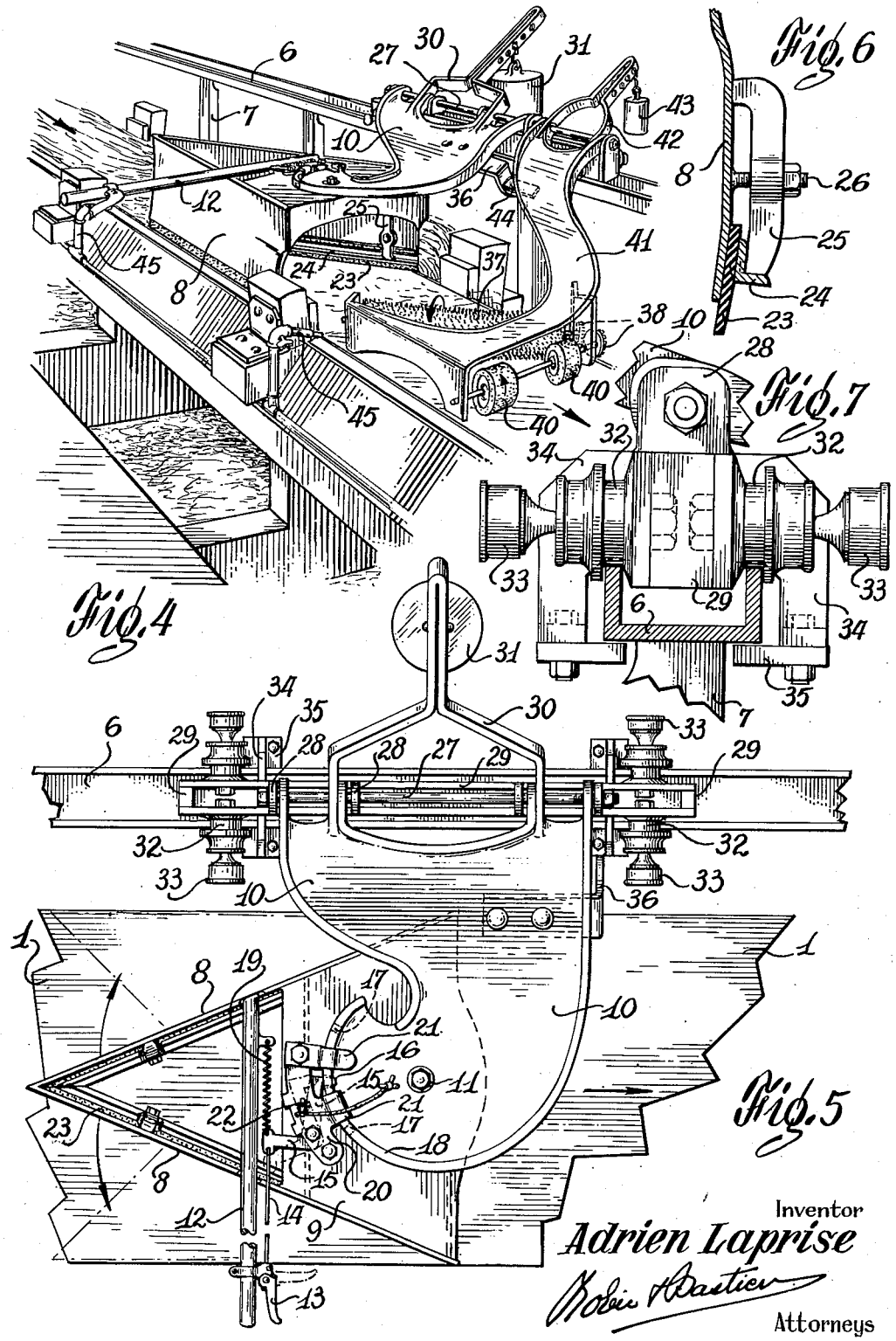
Inventor
Adrien Laprise
Attorneys Patented Sept. 25, 1951

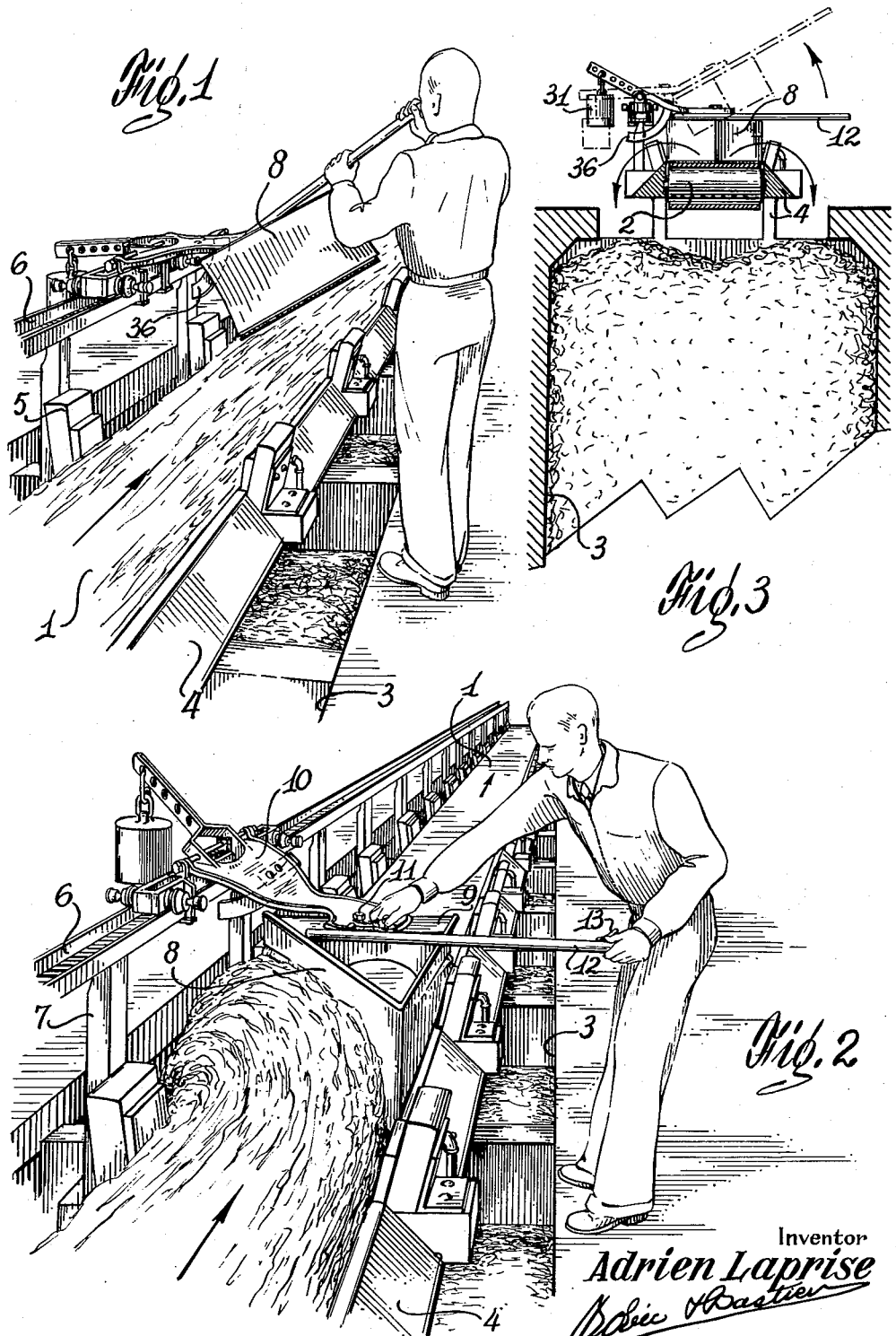

2,569,011

UNITED STATES PATENT OFFICE 2,569,011

APPARATUS FOR UNLOADING CONVEYER BELTS

Adrien Laprise, Trois-Rivieres, Quebec, Canada

Application December 7, 1949, Serial No. 131,574

3 Claims. (Cl. 198—188)

The present invention relates to a plough for removing chips or the like from a conveyor belt, and more particularly to a plough for removing chips from a conveyor belt and evenly distributing the same into storage tanks.

The general object according to the present invention is to provide improved means for removing wood chips or the like from a conveyor belt and distributing the same over the entire cross sectional area of a storage tank lying under said conveyor belt.

Another object according to the present invention is the provision of a plough which is adapted to contact the upper surface of a travelling conveyor belt for removing therefrom chips or the like, and of means for positioning said plough along any desired point of a substantial portion of said conveyor belt.

A further important object according to the present invention is the provision of a plough for removing chips or the like from a conveyor belt which may be adjustably positioned in proximity to the carrying surface of the conveyor belt for deflecting the transported material either in one direction or the other, or in both at the same time.

A further important object according to the present invention is the provision in combination with a plough of the character described, of means for cleaning completely the belt of the material transported thereby.

Other important objects according to the present invention will become more apparent during the following disclosure and by referring to the drawings in which:

Figure 1 is a perspective view of a conveyor belt and associated plough according to the present invention in lifted non-operative position;

Figure 2 is a perspective view of a conveyor belt and associated plough according to the invention, said plough being in contact with the carrying surface of the conveyor belt and in position to deflect the transported material in one direction only;

Figure 3 is a cross section of the conveyor belt and the storage tank lying thereunder, together with a front elevation of the plough in working position for deflecting the transported material over both sides of said conveyor belt;

Figure 4 is a perspective view of the conveyor belt, the storage tank and the plough according to the invention, together with cleaning means for the belt, operable by the latter;

Figure 5 is a plan view of the belt and associated plough according to the invention;

Figure 6 is a cross section of the blade of the plough and associated flexible strip adapted to contact the upper surface of the conveyor belt, and, Figure 7 is a cross section of the rail supporting the travelling mechanism of the plough.

Referring now more particularly to the drawings in which like reference characters indicate like elements throughout, the numeral 1 indicates the conveyor belt supported on rollers 2 over a storage tank or bin 3, the structure 4 supporting the conveyor belt and rollers, being provided with regularly spaced projections 5 in opposite relation on both sides of the conveyor belt. The structure 4 further supports a channel rail 6 by means of posts 7, said channel rail 6 being disposed in parallel relation with the conveyor belt and above the same.

The plow according to the present invention is provided with two blades 8 disposed in substantially V-shaped configuration, the apex of said plough pointing in a direction opposite to the normal travelling direction of the conveyor belt.

The two blades 8 of the plough are maintained in the desired rigid position by means of a top cross-plate 9 secured to said blade, and by which the plough is pivotably held to the carrier member 10 by means of bolt 11 as shown in Figure 5.

A handle 12 is transversely secured to the top of the plough in order to rotate it above the pivot bolt 11 and to lift it out of contact with the conveyor belt 1 or to place it back into position.

To the free end of the handle 12 is fastened a control lever 13 which actuates by means of wire 14, a bell-crank lever 15, the latter being pivoted to the top cross-plate 9 of the plough.

The bell-crank lever 15 is provided at its free end with a projection or finger 16 engageable with either one of a plurality of holes 17 made in an upwardly projecting flange 18, provided at the arcuately bent edge of the carrier member 10.

When the control lever 13 is pressed against the handle 12, the bell-crank lever 15 is pivoted so that the finger 16 is brought out of engagement with a hole 17. Thus the plough may be rotated to any other desired position.

Upon release of the control lever 13, the bell-crank lever 15 is urged back by means of spring 19 which is attached to said bell-crank lever at one end and at the other end to the handle 12.

A guard plate 20 protects the bell-crank lever 15, being bolted into spaced parallel position over the top cross-plate 9. This guard plate 20 is further provided with guiding members 21 in cooperative engagement with the flange 18 of the carrier member 10.

In order to lock the plough into its intended position, a locking pin 22 may be inserted into suitable holes of the guard plate 20 and crossplate 9, in contact with the free end of the bellcrank lever 15 when the same is engaged with the carrier member 10.

The blades 8 of the plough are provided at their lower edge with a strip of resilient material 23 preferably rubber or the like, in order to prevent damage to the carrying surface of the conveyor belt, when the plough comes into contact with it. The strip 23 is removably secured to the blade 8 by means of an angle iron bar 24 which presses the strip 23 in contact with the back face of the blade 8. Said angle iron bar 24 is maintained by means of a clamp 25 inserted into a bolt 26, itself rigidly secured to the blade 8.

The carrier member 10 is pivoted for vertical movement about a hinge rod 27, itself inserted into suitable projections 28 of a frame member 29 which is part of the travelling mechanism.

In order to easily lift the plough out of contact with the conveyor belt, the carrier member 10 is provided with an upwardly projecting yoke 30 at the free end of which may be adjustably secured a counterweight 31.

The two ends of the elongated frame member 29 are provided with a pair of rollers 32 preferably mounted on ball bearings and having grease cups 33, said rollers bearing on the channel rail 6.

In order to prevent the travelling mechanism from jumping out of the channel rail 6, the frame member 29 is provided near each pair of rollers 32 with an inverted U-shaped member 34 provided at its lower ends with bolted pieces 35 in spaced relation with the underside of the channel rail 6. The pieces 35 are simply removed when it is desired to lift the travelling mechanism out of contact with the channel rail 6 for repair or other purposes.

In order to prevent the plough from moving along with the wood chips carried by the conveyor belt and impinging on said plough, the carrier member 10 is provided with a downwardly bent stop arm 36 which comes into contact with one face of the posts 7 supporting the channel rail 6. This stop arm 36 serves also to maintain the plough into lifted posiiton when it is so desired by contacting the face of a post 7 adjacent the conveyor belt, as shown in Figure 1.

If it is desired to further clean the carrying surface of the conveyor belt after its passage under the plough, further cleaning means may be provided in combination with the plough described hereabove.

Said cleaning means may preferably comprise a rotatable cylindrical brush 37, rotatably connected by means of bevel gears 38 to a pair of rollers 40 frictionally contacting the travelling conveyor belt for rotation. The above described cleaning means are all mounted on a suitable carrier member 41, itself pivotally mounted on a suitable travelling mechanism similar to that described for the plough and connected thereto, said carrier member being further provided with a yoke 42 and suitable counterweights 43. The travelling mechanism of the cleaning means is linked by any suitable means to that of the plough and moves in unison therewith.

In order to lift the hereabove described cleaning mechanism at the same time as the plough, an extension 44 is secured to the stop arm 36 of the carrier member 10, and engages the underface of the carrier member 41.

Alternately, or in combination with the hereabove described cleaning mechanism, a plurality of compressed air jets 45 may be positioned along the side edges of the travelling conveyor belt to provide a jet of compressed air to further clean the belt from the last remaining chips or dust particles.

Thus the plough and cleaning means according to the present invention provide a simple and easily operated means to evenly distribute in a storage tank wood chips and the like carried by a conveyor belt.

While a preferred embodiment according to the present invention has been illustrated and described, it is understood that various modifications may be resorted to without departing from the spirit and scope of the appended claims.

Having thus described my invention, I claim:

1. Apparatus for unloading a conveyor belt comprising in combination with the conveyor belt and means for driving the same, spaced posts disposed at one side of said conveyor belt and extending above the same, a rail secured to said posts extending alongside and at a higher level than said conveyor belt, a wheeled member displaceable on said rail, a carrier member extending across said conveyor belt and pivotally mounted on said wheeled member for vertical rotation, a plough member mounted at the free end of said carrier member, a handle secured to said plough for moving the same longitudinally of said conveyor for positioning the same in contact with said conveyor belt and for lifting the same out of contact with said conveyor belt, and a stop arm secured to said carrier member, depending downwardly therefrom to abut said posts for preventing longitudinal displacement of said wheeled member when said plough is in lowered position and to maintain said plough in its lifted position.

2. Apparatus for unloading a conveyor belt comprising in combination with the conveyor belt and means for driving the same, stationary spaced posts disposed adjacent one side of said conveyor belt and extending above the same, a rail secured to said posts extending at a higher level than and at the side of said conveyor belt, a wheeled member displaceable on said rail, a carrier member pivotally mounted on said wheeled member for vertical rotation above and across said conveyor belt, a plough member pivotally mounted for horizontal rotation about the free end of said carrier member, a handle secured to said plough and extending outwardly from the same, said plough and carrier member pivotable on said wheeled member to take a lowered position with said plough in contact with the surface of said conveyor belt and a lifted position with said plough out of contact with said conveyor belt, a downwardly extending arm rigidly secured to said carrier member for abutting a face of said posts to prevent longitudinal displacement of said plough when in lowered position and for abutting another face of said posts for maintaining said plough and carrier member in lifted position and releasable latching means between said plough and said carrier member to lockably adjust the angular position of said plough relatively to said conveyor belt.

3. An apparatus for unloading a conveyor belt comprising in combination with the conveyor belt and means for driving the same, stationary spaced vertical posts alongside said conveyor belt and extending above the same, a horizontal rail secured to said posts at a higher level than said conveyor belt, a wheeled member displaceable on said rail, means to prevent disengagement of said wheeled member with said rail, a carrier member extending across said conveyor belt and pivotally mounted on said wheeled member for vertical rotation above said conveyor belt, a V-shaped plough pivotally mounted at the free end of said carrier member for limited horizontal rotation relative to said conveyor belt, said carrier member and plough movable to take a lowered position with said plough in contact with the moving surface of said conveyor belt and a lifted position with said plough out of contact with the same, a downwardly extending arm rigidly secured to said carrier member for abutting said posts to prevent longitudinal displacement of said plough relative to said conveyor belt when in lowered position and to maintain said plough in lifted position, an outwardly extending handle rigidly secured to said plough and manipulable to adjust the angular position of said V-shaped plough relatively to said conveyor belt, to displace said plough to and from its lifted position and its lowered position and vice versa, and for longitudinally displacing said plough along said conveyor belt, and releasable locking means between said V-shaped plough and said carrier member to lockably adjust the angular position of said plough relatively to said conveyor belt comprising a manually operated lever pivotally mounted at the free end of said handle.

ADRIEN LAPRISE.

REFERENCES CITED

The following references are of record in the file of this patent:

UNITED STATES PATENTS

| Number | Name | Date |
|---|---|---|
| 323,323 | Hack et al. | July 28, 1885 |
| 768,607 | Labelle | Aug. 30, 1904 |
| 836,679 | Garred | Nov. 27, 1906 |
| 2,099,071 | Lundbye | Nov. 16, 1937 |